US005488535A

United States Patent [19]

Masghati et al.

[11] Patent Number: 5,488,535

[45] Date of Patent: Jan. 30, 1996

[54] ARC SUPPRESSOR FOR SIDACTORS

[75] Inventors: Mohammad Masghati, Addison; Jack R. Cline, Bartlett, both of Ill.

[73] Assignee: Illinois Tool Works Inc., Glenview, Ill.

[21] Appl. No.: 418,276

[22] Filed: Apr. 7, 1995

Related U.S. Application Data

[63] Continuation-in-part of Ser. No. 188,509, Jan. 26, 1994, Pat. No. 5,424,901.

[51] Int. Cl.[6] .......... H02H 9/04

[52] U.S. Cl. .......... 361/119; 361/56; 361/124

[58] Field of Search .......... 361/119, 56, 55, 361/103, 111, 115, 124, 121

[56] References Cited

U.S. PATENT DOCUMENTS

| | | | |
|---|---|---|---|
| 2,413,887 | 1/1947 | Pittman | 200/120 |
| 3,023,289 | 2/1962 | McAllster | 200/131 |
| 3,123,696 | 3/1964 | McAllster | 200/132 |
| 3,710,297 | 1/1973 | Kawazoe | 337/290 |
| 4,047,143 | 9/1977 | Burden et al. | 337/239 |
| 4,233,641 | 11/1980 | Baumbach | 361/119 |
| 4,371,911 | 2/1983 | Baker | 361/124 |
| 4,635,091 | 1/1987 | Roger | 357/67 |
| 4,717,902 | 1/1988 | James | 337/32 |
| 4,858,059 | 8/1989 | Okura | 361/124 |
| 4,910,489 | 3/1990 | Neuwirth et al. | 337/32 |
| 5,029,302 | 7/1991 | Masghati et al. | 337/32 |
| 5,089,929 | 2/1992 | Hilland | 361/111 |

FOREIGN PATENT DOCUMENTS

| | | | |
|---|---|---|---|
| 2167915 | 6/1986 | United Kingdom | H02H 3/22 |

*Primary Examiner*—Todd DeBoer
*Attorney, Agent, or Firm*—Schwartz & Weinrieb

[57] ABSTRACT

An arc suppressor for a sidactor type protective device wherein the sidactor type protective device comprises a sidactor body portion, two end line terminals, a central ground terminal, and a fail-safe mechanism mounted upon the terminals of the sidactor in order to shunt or short-circuit the sidactor under overload conditions. The arc suppressor comprises a housing or cap tightly enveloping or encasing the sidactor body portion so as to enhance the strength thereof and thereby maintain the structural integrity of the body portion by effectively preventing any cracking thereof under overload conditions. The prevention of the cracking of the sidactor body, in turn, insures that any plasma gas or cloud generated within the sidactor body under high-voltage overload conditions is contained within the sidactor body and does not escape therefrom so as to otherwise present an environment conductive to arcing between the terminals of the sidactor.

20 Claims, 3 Drawing Sheets

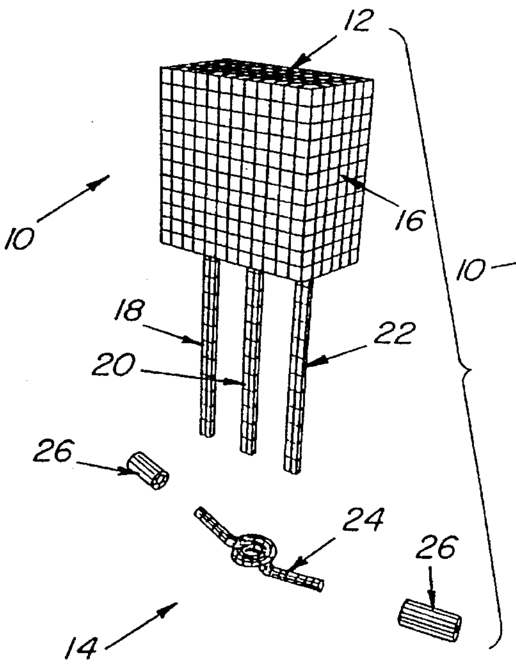
Fig. 1
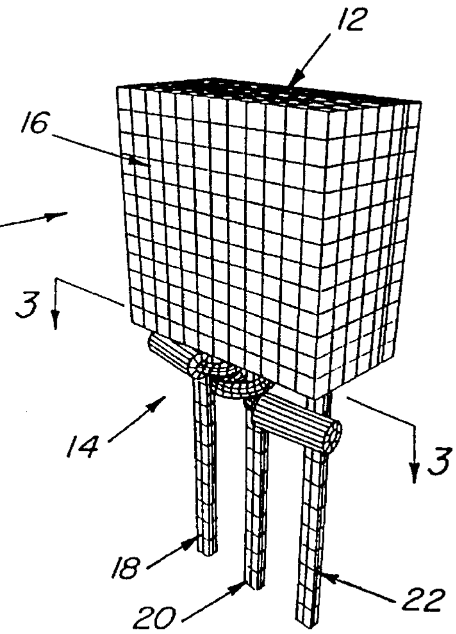
Fig. 2
Fig. 4
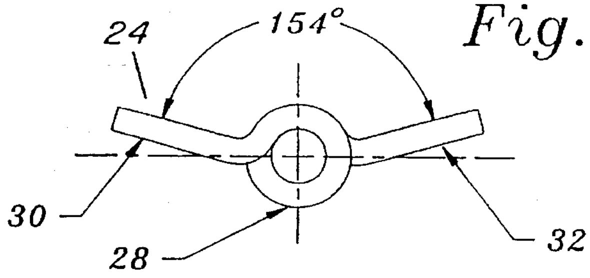
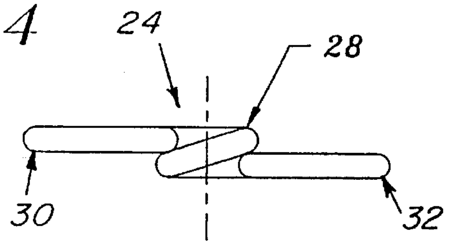
Fig. 5
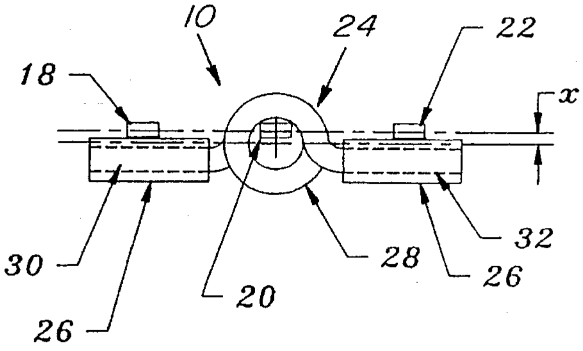
Fig. 3
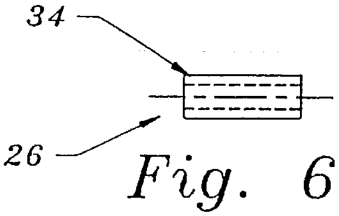
Fig. 6
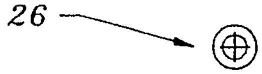
Fig. 7

FIG. 10
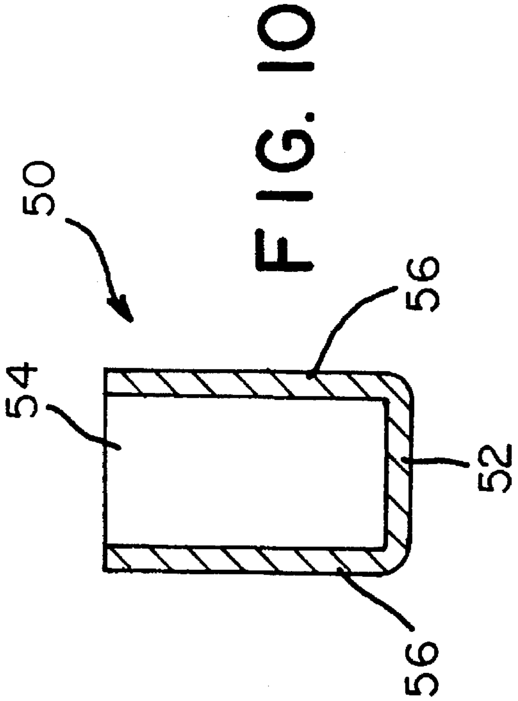
FIG. 8
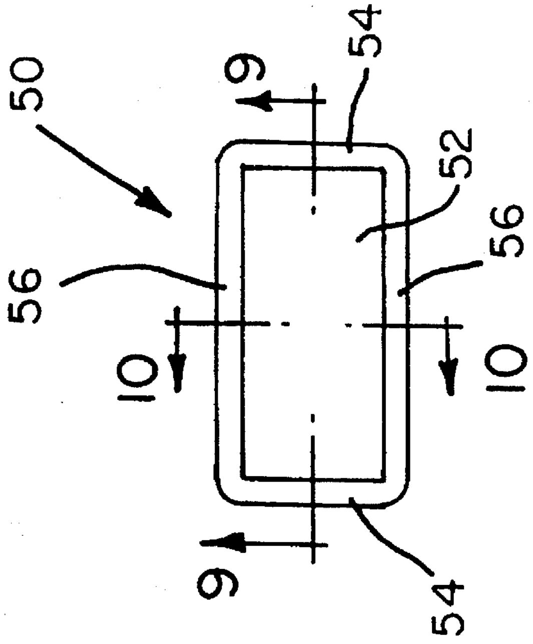
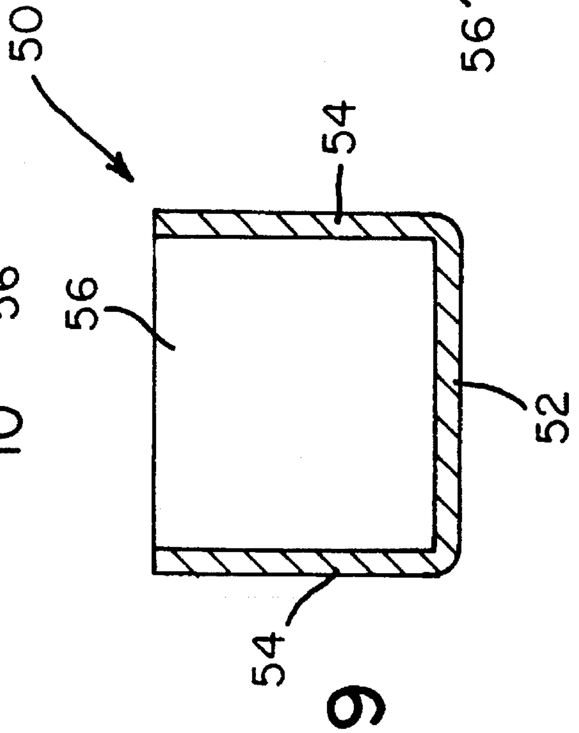
FIG. 9

FIG. 12
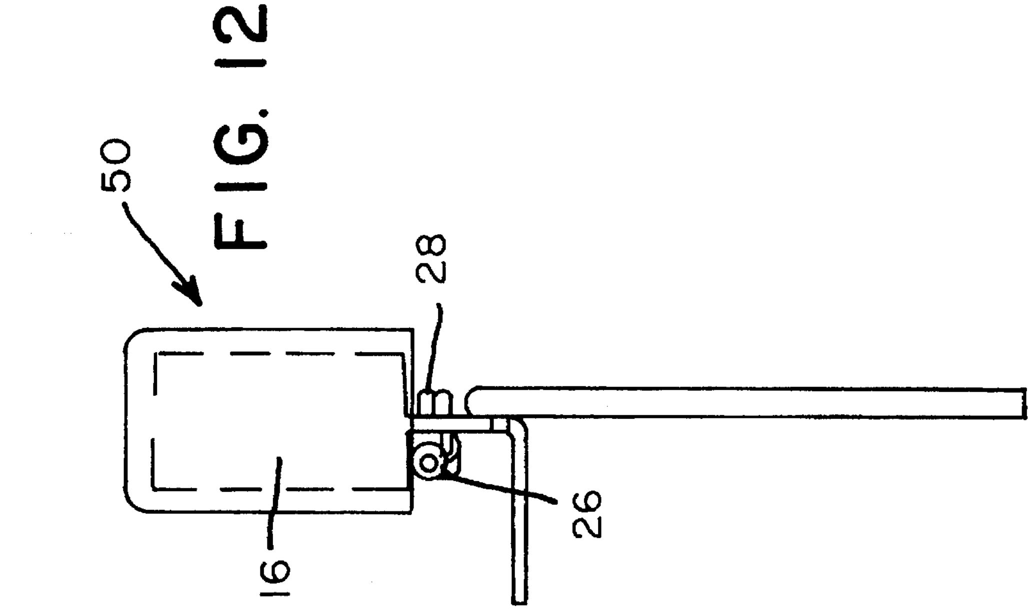
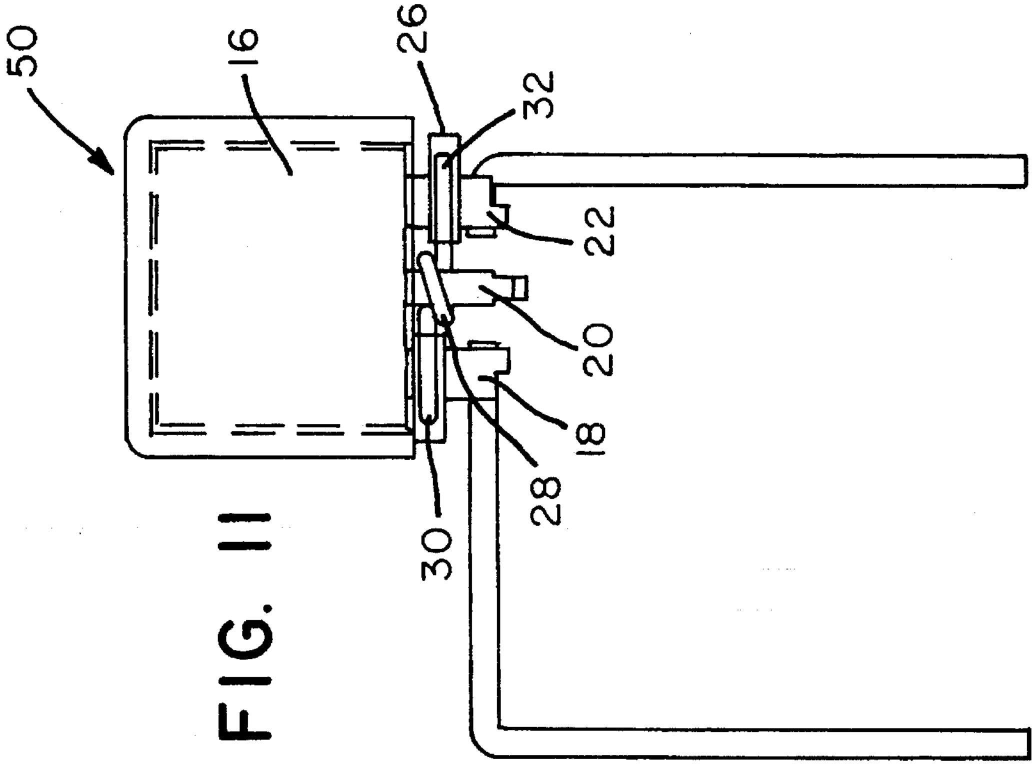
FIG. 11

ARC SUPPRESSOR FOR SIDACTORS

CROSS-REFERENCE TO RELATED PATENT APPLICATIONS

This patent application is a Continuation-In-Part (CIP) patent application of U.S. patent application Ser. No. 08/188,509 entitled SIDACTOR FAIL-SAFE DEVICE, filed on Jan. 26, 1994U.S. Pat. No. 5,424,901.

FIELD OF THE INVENTION

The present invention relates generally to electrical overvoltage protective devices, and more particularly to an arc suppressor utilized in conjunction with a sidactor type protective device for protecting telecommunication equipment against high voltage surges, wherein the sidactor protector includes a shunt protection arrangement, and wherein further, the arc suppressor prevents the development of arcing conditions attendant high voltage surge states.

BACKGROUND OF THE INVENTION

Various devices for protecting electrical circuits, and equipment incorporated within such circuits, are of course well-known. For example, in U.S. Pat. 4,910,489 issued to Helmuth Neuwirth et al. on Mar. 20, 1990, there is disclosed a fail-safe secondary fuse device 20 for assuring the grounding of a conductive gas tube incorporated within modular protection devices for individual subscriber circuit pairs. The device comprises a length of spring music wire 21 which has a central loop adapted to surround the central electrode contact 19 of the gas tube 10, and rectilinear legs 23 and 24 which terminate in ends 25 and 26. The contacts 17 and 18 of the end electrodes 15 and 14 of the gas tube 10 are insulated from direct electrical communication with the respective ends 25 and 26 of the device 20 by means of a fusible sleeve 27 fabricated of suitable insulative material and incorporated upon each one of the ends 25 and 26 of the device 20. Upon the occurrence of a continued current overload condition or state, the heat emanating from the gas tube 10 will serve to fuse or melt the sleeves 27 whereby the ends 25 and 26 of the legs 23 and 24 will be permitted to short circuit the end electrodes 15 and 14 to the central electrode 16 which is grounded.

In U.S. Pat. 4,717,902, which issued to Kenneth S. James on Jan. 5, 1988, there is disclosed an excess voltage arrestor which is provided with a protective temperature responsive device formed from a wire 1 of spring temper. The wire 1 has a central loop portion 2 and is coated with a polyurethane varnish 3. In a manner similar to that of Neuwirth et al., the loop portion 2 is disposed about the terminal pin 4 of the central or intermediate electrode of the voltage arrestor, while the spring arms of the wire 1 are disposed in a stressed condition as a result of being gaged with the terminal pins 5 of the outer electrodes of the volt age arrestor. When the voltage arrestor 1 experiences or senses an elevated temperature due to overload conditions, the coating comprising the polyurethane varnish decomposes so as to permit the now bare wire 1 to establish electrical contact between the terminal pins 4 and 5.

In U.S. Pat. No. 4,858,059 which issued to Masahiko Okura on Aug. 15, 1989, there is disclosed a short-circuit device for use in connection with a gas-filled, triple-pole discharge-tube type arrester. The arrester is used in conjunction with telephone lines and includes a coil-like resilient short-circuit lead 7 which is spot-welded at its central portion to a lead 5 of an earth or ground electrode 4, and wherein the end portions of the lead 7 are disposed in forced engagement with leads 3,3 of line electrodes 2,2 as a result of the short-circuit lead 7 being mounted upon the electrode leads 3,3,5 in an entwined manner. The end portions of the lead 7 which are disposed in contact with the line electrode leads 3,3 are coated with a low temperature-meltable insulator 8,8.

Continuing further, in United Kingdom Patent Application Number 2,167,915 which was published on Jun. 4, 1986, a circuit protection arrangement is disclosed which includes a normally-closed switch contact 4 in the form of a resilient wire. The wire is tensioned so as to be biased toward the central contact earth pin 2 of double gas discharge tube 1 but is normally constrained into contact a contact pin 3 of an input line L1 or L2 by means of a fusible joint at, for example, point P1. When the temperature of the gas discharge tube 1 rises sufficiently so as to melt the fusible alloy or solder comprising joint P1 when, for example, a surge or transient signal occurs, the switch contact 4 is released from its constrained position so as to short the output terminals E1 or E2 to ground.

As is generally well-known, the purpose of overvoltage protection circuits, devices, or arrangements is to protect the expensive equipment with which the overvoltage protection circuits, devices, or arrangements are operatively associated. Such protection circuits, devices, or arrangements are commonly associated with, for example, telecommunication equipment which is operatively connected to the output side of a terminal circuit so as to protect such equipment against high voltage surges caused, for example, by lightning strikes on the subscriber line. With the advent of electronic circuits for use within telecommunication equipment, there has arisen a need for providing new types of overvoltage protection means for such electronic circuits since they cannot tolerate overvoltage levels which were permissible or tolerable heretofore.

As has been previously briefly discussed in connection with the aforenoted patents to Neuwirth et al., James, Okura, Phillips et al., a known conventional type of overprotection device in widespread use comprises the so-called three-element gas tube having a pair of laterally spaced apart end electrodes and a central electrode wherein the end electrodes are typically connected to a pair of output lines coupled to the telephone equipment which is desired to be protected against excessive voltage levels, while the central electrode is connected to earth ground. Upon the occurrence of a voltage force between the end electrodes or between either one of the end electrodes and the central electrode wherein the voltage force has a value which is greater than a predetermined potential level, the gas tube becomes electrically conductive so as to shunt the overvoltage to ground and thereby protect the telecommunication equipment from the potentially damaging excessive voltage levels. However, in the event of a sustained overvoltage, overcurrent condition or state, that is, where the circuits exhibit power crossing characteristics, the gas tube remains conductive and becomes overheated thereby causing a fire hazard. Accordingly, it is important that the gas tube shuts down safely so as not to leave the telecommunication equipment exposed to the damaging overvoltage, overcurrent conditions.

The prior art has therefore also developed various types of fail-safe devices, arrangements, systems, circuits, and the like for use in conjunction with gas tubes and other kinds of overvoltage protection means, such as, for example, air-gap arrestors and the like. One form of fail-safe arrangement comprises a temperature responsive device comprising a resilient, electrically conductive member which is normally maintained in a stressed condition by means of a heat-softenable material. However, when the heat-softenable material is used to normally hold the stressed resilient, electrically conductive member out of engagement with a cooperative tact and is melted so as to permit the establishment of a circuit arrangement between the conductive member and the cooperative contact, there exists the possibility that the stress applied to the conductive member will not be sufficient enough to cause the conductive member to properly engage the cooperative contact and thereby shunt the overvoltage potential to ground within a predetermined time interval.

In accordance with later technological developments of the prior art, the known or conventional three-element gas tubes have been generally replaced by means of-solid-state voltage suppressors commonly referred to as sidactors which have similar structural dimensions with respect to those characteristic of the gas tubes. sidactors are provided with a plurality of legs for enabling mounting of the sidactors within corresponding holes provided within a printed circuit board, and as a result, the telephone connector blocks incorporating the printed circuit boards therein can be fabricated with an even higher circuit density. It has therefore been necessary to provide an improved fail-safe shunt protection arrangement for assuring that sufficient pressure is applied to the shunt device or arrangement so as to in fact ground the sidactor at elevated temperature levels without significantly increasing the amount of space required.

The invention disclosed within the aforenoted parent patent application was directed toward the aforenoted desired improvement in order to in fact provide an improved fail-safe shunt protection arrangement or device for use in connection with sidactors. In particular, the improved fail-safe shunt protection arrangement was directed toward providing the requisite or sufficient pressure upon the contact pins of the sidactor when grounding of the sidactor is required under overvoltage, overcurrent elevated temperature conditions. More particularly, the invention of the parent patent application comprised a torsional type spring element whose spring arms were initially formed so as to have an obtuse angle with respect to each other, and when the spring element was mounted upon the sidactor, the spring arms were forced to assume a rectilinearly aligned position with respect to each other so as to place the spring arms under the requisite amount of tension. In addition, the center of the single loop portion of the torsional spring was disposed in an off-center relationship with respect to the centers of the sidactor terminal pins in order to further insure that sufficient and constant pressure was defined between the spring element spring arms and the end terminal pins. The ends of the spring arms are provided with insulators, and upon the occurrence of a sustained overload condition, the heat emanating from the sidactor will melt the insulators so as to short-circuit the end terminal pins with respect to the central terminal pin.

While the aforenoted sidactor and fail-safe mechanism of the parent patent application have proven to be quite satisfactorily operative under most overload conditions whereby, for example, the expensive telecommunication equipment, with which the sidactors and fail-safe mechanisms have been operatively associated, have been properly or adequately protected, it has been experienced that under certain overload conditions, such as, for example, at a voltage level of 600 VAC and a current level of 120 or 360 amps, the sidactor body member or packaging does not have sufficient strength to withstand such overload conditions or voltage and current levels and accordingly, its integrity is not always able to be maintained In particular, cracking of the sidactor body member or packaging has been experienced, and as a result of such cracking, plasma gas or a plasma cloud is able to escape or be released from the sidactor body or packaging. Such a plasma cloud is undesirable from an operational viewpoint for the sidactor because such plasma gas provides an environment in which undesirable arcing between the leads of the sidactor can readily occur.

OBJECTS OF THE INVENTION

Accordingly, it is an object of the present invention to provide a new and improved sidactor fail-safe device.

Another object of the present invention is to provide a new and improved sidactor fail-safe device or mechanism wherein enhanced arc-suppression capabilities are provided.

Still another object of the present invention is to provide a new and improved sidactor fail-safe device or mechanism which exhibits increased packaging strength so as not to experience cracking under overload conditions.

Yet another object of the present invention is to provide a new and improved sidactor fail-safe device or mechanism which comprises improved packaging techniques or structure which may be provided upon or incorporated within existing sidactor components.

SUMMARY OF THE INVENTION

The foregoing and other objects of the present invention are achieved through the provision of a sidactor type voltage suppressor which comprises a substantially rectangularly-shaped body member having first and second end terminal line pins, and a central grounded terminal pin. A torsional type spring element fail-safe mechanism is adapted to be mounted upon the end and central terminal pins as is originally disclosed within the aforenoted parent patent application, and in accordance with the specific principles of the present invention, a plastic housing, fabricated, for example, from ABS plastic, is disposed about the rectangularly-shaped body of the sidactor so as to tightly encase or envelop the same. The sidactor body-housing assembly therefore exhibits increased strength which enables the sidactor to withstand overload conditions without experiencing any cracking. As a result, the release or vented, therefore undesirable arcing conditions cannot occur.

BRIEF DESCRIPTION OF THE DRAWINGS

Various other objects, features, and attendant advantages of the present invention will be more fully appreciated from the following detailed description, when considered in connection with the accompanying drawings in which like reference characters designate like or corresponding parts throughout the several views, and wherein:

FIG. 1 is an exploded, perspective view of a sidactor fail-safe device of the type in connection with which the housing or cap of the present invention may be operatively associated;

FIG. 2 is a perspective view of the sidactor fail-safe device shown in FIG. 1 and illustrated here in its assembled state;

FIG. 3 is a cross-sectional view of the assembled sidactor fail-safe device of FIG. 2 as taken along the lines 3—3 of FIG. 2;

FIG. 4 is an enlarged top plan view of the torsional spring of the sidactor fail-safe device of FIG. 1;

FIG. 5 is a side elevational view of the torsional spring of FIG. 4;

FIG. 6 is an enlarged side elevational view of one of the insulators of the sidactor fail-safe device of FIG. 1;

FIG. 7 is an end view of the insulator of FIG. 6;

FIG. 8 is a top plan view of the housing or cap member which is adapted to be mounted upon the sidactor body member of the sidactor fail-safe device of FIG. 1 so as to envelop or encase the sidactor body member;

FIG. 9 is a cross-sectional view of the housing or cap member of FIG. 8 as taken along the lines 9—9 of FIG. 8;

FIG. 10 is a cross-sectional view of the housing or cap member of FIG. 8 as taken along the lines 10—10 of FIG. 8;

FIG. 11 is a front elevational view of the sidactor fail-safe device of FIG. 2 having the housing or cap member of FIG. 8 assembled thereon; and FIG. 12 is a side elevational view of the sidactor fail-safe device-housing assembly of FIG. 11.

DETAILED DESCRIPTION OF THE PREFERRED EMBODIMENT

Referring now to the drawings, and more particularly to FIGS. 1 and 2 thereof, a sidactor fail-safe device, in connection with which the cap or housing of the present invention may be operatively associated or used, will be described first. As shown in FIGS. 1 and 2, a sidactor fail-safe device, of the type with which the protective cap or housing of the present invention can be operatively associated or used, is generally designated by the reference character 10, and is seen to comprise a conventional solid-state voltage suppressor in the form of a sidactor 12, and a fail-safe mechanism 14 which is adapted to be thermally activated by means of heat generated by the sidactor 12 under overload, elevated temperature conditions.

The sidactor 12 is seen to comprise a substantially rectangularly-configured body member 16, and three legs 18, 20, and 22 which serve as terminal pins for insertion within holes formed within a printed circuit board, not shown. In use, the laterally spaced, end terminal pins 18 and 22 of the sidactor 12 are typically connected to two wires of a subscriber line extending between an output tip terminal and an output ring terminal which together define a protected side to which telecommunication equipment, which is to be protected against excessive voltage levels, is connected. The central terminal pin 20 is connected to an earthed ground. Consequently, upon the occurrence of a voltage potential, either between the end terminals 18 and 22, or between either one of the end terminals 18,22 and the central terminal pin 20, which comprises a voltage level which exceeds a predetermined strike voltage level, the sidactor 12 is activated so as to divert or shunt the overvoltage to the ground potential thereby protecting the telecommunication equipment from being damaged or destroyed. Such overvoltage conditions may typically be caused by lightning strikes, contact with a high-voltage line, and/or other similar types of events.

The fail-safe mechanism 14 comprises a torsional type spring 24, and a pair of flexible insulators 26 disposed upon the distal end portions of the spring 24. The spring is preferably made from a wire of spring temper, such as, for example, phosphor bronze, beryllium copper, or the like, and is bent so as to have a single central coil or looped portion 28, and a pair of spring arms 30 and 32 which extend substantially radially outwardly from opposite sides of the central coil or looped portion 28. The wire is preferably a 22-gauge wire which has a diameter of 0,025 inches.

As can best be seen from FIG. 4, the spring arms 30 and 32 of the torsional spring 24 are disposed or bent so that they do not initially lie in a straight line forming a 180° angle therebetween. More specifically, it has been found to be critically important to the operation of the fail-safe mechanism 14 that the angle defined between the spring arms 30 and 32, when the same are disposed in their non-stressed, non-assembled state, be obtuse. In accordance with the preferred embodiment of the mechanism, this included obtuse angle is approximately 154° which effectively determines amount of time it takes the torsional spring to divert or shunt overvoltage condition to ground.

The insulators 26 are disposed upon the respective ends of the spring arms 30 and 32 of the torsional spring 24, and as shown in FIGS. 6 and 7, each insulator 26 comprises a relatively short tubular-shaped member 34. Each insulator 26 is fabricated from a substantially resilient and rubber-like material, such as, for example, plasticized polyvinyl chloride (PVC) or the like. In accordance with the preferred embodiment of the mechanism, each insulator has a length dimension of approximately 0.150 inches, and an inner diameter of approximately 0.027 inches. In this manner, the inner diametrical dimension of each insulator permits the insulator to slide over the respective spring arm 30 or 32, and in addition, allows each insulator to be rolled upon the terminal pins 18 and 22 as the fail-safe mechanism 14 is mounted upon the sidactor 12 during assembly. Furthermore, the length dimension of each insulator 26 provides the necessary isolation of the terminal pins of the sidactor 12. The insulators 26 also have an operative temperature range of approximately −20° C. to +105° C.

With reference being made to FIGS. 1 and 2, in order to assemble the sidactor fail-safe device 10, the insulators 26 are slid onto the ends of the spring arms 30 and 32 of the torsional spring 24 so as to form the fail-safe mechanism 14. Subsequently, the central terminal pin 20 of the sidactor 12 is inserted into the looped portion 28 of the torsional spring 24. As the fail-safe mechanism 14 is moved upwardly along the terminal pins toward the body member 16, the insulators 26 will roll upon the end terminal pins 18 and 22 so as to facilitate the location of the mechanism 14 upon the sidactor 12 when the sidactor fail-safe device 10 is in its fully assembled state as shown in FIG. 2. In this manner, the ends of the spring arms 30 and 32 forcefully engage and are supported upon the outer surfaces of the end terminal pins 18 and 22 of the sidactor 12 through means of the insulators 26.

As depicted in the cross-sectional view of FIG. 3, it is to be noted that when the spring 24 of the fail-safe mechanism 14 is mounted upon the terminal pins 18, 20, and 22 of the sidactor 12, the center of the looped portion 28 of the torsional spring 24, surrounding the central terminal pin 20 of the sidactor 12, is disposed in an off-center relationship with respect to the centers of the terminal pins 18, 20, and 22, and this disposition of the torsional spring 24, and the looped portion 28 thereof, is considered to be the pre-loaded condition. In other words, the center of the looped portion 28 of the torsional spring 24, and the centers of the terminal pins 18, 20, and 22 of the sidactor 12, are not aligned with respect to each other. More particularly, there is defined or created an offset distance x between the center of the looped portion 28 of the spring 24 and the centers of the terminal pins 18, 20, and 22. This off-centered condition or state serves to insure that sufficient and constant pressure is developed or generated by the spring arms 30 and 32 of the spring 24, and applied to or impressed upon the end terminal pins 18 and 22 of the sidactor 12, through means of the insulators 26 mounted upon the ends of the spring arms 30 and 32, so as to cause proper grounding of the sidactor 12 under overload, elevated temperature conditions. This preloaded condition also serves to maintain a constant and proper pressure between the looped portion 28 of the spring 24 and the central terminal pin 20 of the sidactor 12. As a result, the sidactor fail-safe device 10 overcomes the problems encountered within the prior art wherein improper or insufficient pressure was characteristic of the noted prior art devices.

The operation of the sidactor fail-safe device 10 will now be briefly described. Upon the occurrence of a sustained over-voltage/over current surge condition which results in excessive heat build-up within the sidactor 12, the heat emanating from the sidactor 12 will cause the insulators 26, disposed upon the ends of the spring arms 30 and 32, to melt sufficiently so as to allow the spring arms 30 and 32 to establish good and direct electrical contact with the respective end terminals 18 and 22 of the sidactor 12 thereby providing a continuous short-circuit for dissipating the surge condition to ground. As a result of the use of the sidactor fail-safe device 10, it is possible to mount a plurality of such sidactor fail-safe devices 10 onto printed circuit boards with a substantially higher packing density without substantially increasing the amount of space which would normally be required for the sidactor 12 alone. The fully assembled fail-safe device 10 is accomodated within the length and depth dimensions of the sidactor 12, while the height dimension is increased by an amount which is less than 0,090 inches.

From the foregoing detailed description, it can be seen that the sidactor fail-safe device 10 provides improved operational characteristics for protecting telecommunication equipment against high voltage surges. In particular, the fail-safe mechanism 14 comprises the torsional spring 24 and the pair of insulators 26. The spring 24 comprises the single looped portion 28 and the pair of spring arms 30 and 32 extending radially outwardly from opposite sides of the looped portion 28. The center of the looped portion 28 is disposed off-centered with respect to the centers of the terminal pins 18, 20, and 22 of the sidactor 12, and in this manner, sufficient and constant pressure by the spring arms 30 and 32, and as applied to or impressed upon the end terminal pins 18 and 22 of the sidactor 12, is assured.

While we have therefore seen that the sidactor fail-safe device 10 provides improved operational characteristics, relative to the prior art devices, for providing the necessary protection to telecommunication equipment under high voltage/high current surge or overload conditions, it has been experienced that under certain overload conditions, the sidactor body member 16 does not have sufficient strength to withstand the voltage and current levels attendant the overload conditions, and accordingly, the sidactor body member exhibits cracking. As a result of such cracking, plasma gas or a plasma cloud attendant the operation of the sidactor is able to escape or be released from the sidactor body member. Such plasma gas or plasma cloud is undesirable from an operational viewpoint in view of the fact that such gas or cloud provides an environment in which undesirable arcing between the leads of the sidactor can readily occur.

Accordingly, in accordance with the principles of the present invention, and with reference being made to FIGS. 8–12 of the drawings, a plastic housing, cap, or casing, generally indicated by the reference character 50, is provided so as to tightly envelop the sidactor body member or portion 16. The housing or cap 50 may be fabricated from a suitable plastic material, such as, for example, ABS, and it is appreciated from FIGS. 9 and 10 that the cap or housing 50 is essentially cup-shaped comprising a bottom wall 52, upstanding end walls 54, and upstanding side walls 56. In assembling the cap or housing 50 onto the sidactor body member or portion 16, the cap, housing, or casing 50 is inverted such that its open end is disposed downwardly, and the cap, housing, or casing 50 is mounted upon the sidactor body member or portion 16 so as to entirely encase or envelop the same as best disclosed in FIGS. 11 and 12. The provision of the housing or casing 50, when assembled upon the sidactor body member or portion 16 in its encasing or enveloping mode adds strength to the sidactor body portion or member 16 so as to maintain the structural integrity thereof during operational functions of the sidactor 12 in response to overload conditions. As a result of the increased strength and maintenance of the structural integrity of the sidactor body member or portion 16, the tendency of the sidactor body member or portion 16 to exhibit cracking during the operation of the sidactor 12 in response to overload conditions is effectively prevented. More importantly, as a result of the effective prevention of cracks within the sidactor body member or portion 16, any plasma gas or cloud normally developed within the sidactor body member or portion 16 as a result of the overload conditions, that is, the plasma gas or cloud comprises ionized gases developed as a result of the voltage levels within the sidactor body member or portion 16, is effectively contained within the sidactor body member or portion 16 and does not escape externally thereof as would normally occur through the cracks of the sidactor body member or portion 16 under overload conditions if the sidactor body member or portion 16 was not effectively protected by means of the enveloping or encasing housing or cap member 50 of the present invention. The escape of such plasma gas or cloud would, in turn, establish an environment surrounding the sidactor 12 which would enable or facilitate undesirable arcing to occur between the various terminal leads 18, 20, and 22 of the sidactor 12. Consequently, by means of the present invention comprising the protective housing or cap member 50, wherein the same envelops or encases the sidactor body portion or member 16, such unwanted or undesirable arcing between the terminal leads 18, 20, and 22 of the sidactor 12 is effectively prevented. Consequently, the sidactor fail-safe device 10 is assured to be properly operative in order to effectively ground overload surges and thereby protect the expensive telecommunication equipment with which the sidactor fail-safe device 10 is operatively associated.

From the foregoing detailed description, it can thus be seen that the present invention provides an improved sidactor fail-safe device for protecting telecommunication equipment against high voltage surges. In particular, in accordance with the present invention, a protective cap or housing is provided so as to tightly encase or envelop the sidactor body member or portion so as to effectively increase the strength thereof and maintain the structural integrity of the sidactor body portion or member under such overload or high voltage surge conditions. In particular, the protective cap or housing effectively prevents the developments of any cracks within the sidactor body portion or member, and consequently, plasma gas attendant the operation of the sidactor under such overload conditions is contained within the sidactor body portion or member and not permitted to escape therefrom. In turn, an environment conducive to arcing is not permitted to develop whereby proper operation of the sidactor fail-safe device is assured under the overload conditions.

While there has been illustrated and described what is at present considered to be a preferred embodiment of the present invention, it is understood by those skilled in the art that variations and modifications may be made to the invention or equivalents may be substituted for particular elements thereof. It is therefore to be understood further that this invention is not to be limited to the particular embodiment disclosed as the best mode contemplated for carrying out the invention, but within the scope of the appended claims, the present invention may be practiced otherwise than as specifically described herein.

What is claimed as new and desired to be protected by Letters Patent of the United States of America, is:

1. An arc suppressor for a sidactor fail-safe device used for protecting telecommunication equipment against high voltage surges, comprising:

a sidactor comprising a substantially rectangularly-shaped body member, first and second end terminal pins, and a central terminal pin;

a fail-safe mechanism mounted upon and engaged with said first and second end terminal pins and said central terminal pin for short-circuiting at least one of said first and second end terminal pins to said central terminal pin under overload conditions; and a housing tightly enveloping said substantially rectangularly-shaped body member of said sidactor so as to increase the strength of said substantially rectangularly-shaped body member of said sidactor and thereby preserve the structural integrity of said substantially rectangularly-shaped body member of said sidactor by preventing the development of cracks within said substantially rectangularly-shaped body member under said overload conditions such that any plasma gas, generated within said substantially rectangularly-shaped body member of said sidactor under said overload conditions, is contained within said substantially rectangularly-shaped body member of said sidactor and not permitted to escape from said substantially rectangularly-shaped body member of said sidactor so as not to develop an environment within which arcing between said end and central terminal pins of said sidactor can occur.

2. An arc suppressor as set forth in claim 1, wherein:

said housing has a substantially cup-shaped configuration comprising a bottom wall, a pair of end walls, and a pair of side walls, and is disposed in an inverted mode over said substantially rectangularly-shaped sidactor body member.

3. An arc suppressor as set forth in claim 1, wherein:

said housing comprises ABS plastic.

4. An arc suppressor as set forth in claim 1, wherein:

said fail-safe mechanism comprises a torsional type spring having a single, central looped portion mounted upon said central terminal pin of said sidactor; a pair of spring arms extending radially outwardly from opposite sides of said looped portion; and a pair of insulators disposed upon end portions of said spring arms for engaging said end terminal pins of said sidactor such that upon the occurrence of said overload conditions, heat emanating from said sidactor will melt said insulators so as to short-circuit said at least one of said first and second end terminal pins to said central terminal pin.

5. An arc suppressor as set forth in claim 4, wherein:

said torsional spring is fabricated from a wire of spring temper comprising one of phosphor bronze and beryllium copper.

6. An arc suppressor as set forth in claim 4, wherein:

said insulators are fabricated from plasticized polyvinyl chloride (PVC).

7. An arc suppressor for a sidactor fail-safe device, comprising:

a sidactor comprising a substantially rectangularly-shaped body member; first and second end terminal pins connected to a circuit to be protected; and a central terminal pin connected to an earth ground;

a fail-safe mechanism mounted upon and engaged with said first and second end terminal pins and said central terminal pin for short-circuiting at least one of said first and second end terminal pins to said central terminal pin under overload conditions; and a casing tightly encasing said substantially rectangularly-shaped body member of said sidactor so as to increase the strength of said substantially rectangularly-shaped body member of said sidactor and thereby preserve the structural integrity of said substantially rectangularly-shaped body member of said sidactor by preventing the development of cracks upon said substantially rectangularly-shaped body member of said sidactor under said overload conditions so as to contain any plasma gas, generated within said substantially rectangularly-shaped body member of said sidactor under said overload conditions, within said substantially rectangularly-shaped body member of said sidactor and thereby prevent said plasma gas from escaping externally of said substantially rectangularly-shaped body member of said sidactor so as to in turn prevent the development of an environment externally of said substantially rectangularly-shaped body member of said sidactor within which arcing between said end and central terminal pins of said sidactor could occur.

8. An arc suppressor as set forth in claim 7, wherein:

said casing has a substantially cup-shaped configuration comprising a bottom wall, a pair of upstanding end walls, and a pair of upstanding side walls, and is disposed in an inverted mode over said substantially rectangularly-shaped sidactor body member.

9. An arc suppressor as set forth in claim 7, wherein:

said casing comprises ABS plastic.

10. An arc suppressor as set forth in claim 7, wherein:

said fail-safe mechanism comprises a torsional type spring having a single, central looped portion mounted upon said central terminal pin of said sidactor; a pair of spring arms extending radially outwardly from opposite sides of said looped portion; and a pair of insulators disposed upon end portions of said spring arms for engaging said end terminal pins of said sidactor such that upon the occurrence of said overload conditions, heat emanating from said sidactor will melt said insulators so as to short-circuit at least one of said first and second end terminal pins to said central terminal pin.

11. An arc suppressor as set forth in claim 10, wherein:

said torsional spring is fabricated from a wire of spring temper comprising one of phosphor bronze and beryllium copper.

12. An arc suppressor as set forth in claim 10, wherein:

said insulators are fabricated from plasticized polyvinyl chloride (PVC).

13. An arc suppressor as set forth in claim 10, wherein:

said pair of insulators are rotatably disposed upon said end portions of said spring arms so as to be rollable upon said first and second end terminal pins of said sidactor when said central looped portion of said torsional type spring is mounted upon said central terminal pin of said sidactor.

14. An arc suppressor for a sidactor fail-safe device, comprising:

a sidactor comprising a substantially rectangularly-shaped body member; first and second end terminal pins connected to a circuit to be protected; and a central terminal pin connected to an earth ground;

a fail-safe mechanism mounted upon and engaged with said first and second end terminal pins and said central terminal pin for short-circuiting at least one of said first and second end terminal pins to said central terminal pin under overload conditions; and a cap tightly enveloping said body member of said sidactor so as to increase the strength of said body member of said sidactor and thereby preserve the structural integrity of said body member of said sidactor, by preventing the development of cracks within said body member of said sidactor, under said overload conditions and thereby retain any plasma gas, generated within said body member of said sidactor under said overload conditions, within said body member of said sidactor and thus prevent said plasma gas from escaping externally of said body member of said sidactor so as to in turn prevent the development of an environment, externally of said body member of said sidactor, within which arcing between said end and central terminal pins of said sidactor could occur.

15. An arc suppressor as set forth in claim 14, wherein:

said cap has a substantially cup-shaped configuration comprising a bottom wall, a pair of upstanding end walls, and a pair of upstanding side walls, and is disposed in an inverted mode over said body member of said sidactor.

16. An arc suppressor as set forth in claim 14, wherein:

said cap comprises ABS plastic.

17. An arc suppressor as set forth in claim 14, wherein:

said fail-safe mechanism comprises a torsional type spring having a single, central looped portion mounted upon said central terminal pin of said sidactor; a pair of spring arms extending radially outwardly from opposite sides of said looped portion; and a pair of insulators disposed upon end portions of said spring arms for engaging said end terminal pins of said sidactor such that upon the occurrence of said overload conditions, heat emanating from said sidactor will melt said insulators so as to short-circuit said at least one of said first and second end terminal pins to said central terminal pin.

18. An arc suppressor as set forth in claim 17, wherein:

said torsional spring is fabricated from a wire of spring temper comprising one of phosphor bronze and beryllium copper.

19. An arc suppressor as set forth in claim 17, wherein:

said insulators are fabricated from plasticized polyvinyl chloride.

20. An arc suppressor as set forth in claim 17, wherein:

said pair of insulators are rotatably disposed upon said end portions of said spring arms so as to be rollable upon said first and second end terminal pins of said sidactor when said central looped portion of said torsional type spring is mounted upon said central terminal pin of said sidactor.

* * * * *